United States Patent
King (10) Patent No.: US 7,467,031 B2
(45) Date of Patent: Dec. 16, 2008

(54) INFLIGHT GRAPHICAL DISPLAY OF METEOROLOGICAL PHENOMENA AND METHOD THEREFOR

(75) Inventor: Richard L. King, Overland Park, KS (US)

(73) Assignee: Honeywell International Inc., Morristown, NJ (US)

(*) Notice: Subject to any disclaimer, the term of this patent is extended or adjusted under 35 U.S.C. 154(b) by 664 days.

(21) Appl. No.: 11/013,253

(22) Filed: Dec. 14, 2004

(65) Prior Publication Data

US 2006/0129286 A1    Jun. 15, 2006

(51) Int. Cl.
*G01C 23/00* (2006.01)
(52) U.S. Cl. .................. 701/4; 701/3; 340/945
(58) Field of Classification Search .......... 701/3–4, 701/10, 14; 340/945, 962–963, 968, 971; 345/10, 204–205
See application file for complete search history.

(56) References Cited

U.S. PATENT DOCUMENTS

| | | | |
|---|---|---|---|
| 6,199,008 B1 | 3/2001 | Aratow et al. | |
| 6,501,392 B2 * | 12/2002 | Gremmert et al. | 340/971 |
| 6,633,801 B1 * | 10/2003 | Durlacher et al. | 701/9 |
| 2002/0039070 A1 | 4/2002 | Ververs et al. | |
| 2002/0039072 A1 | 4/2002 | Gremmert et al. | |
| 2004/0183695 A1 | 9/2004 | Ruokangas et al. | |

OTHER PUBLICATIONS

PCT International Search Report PCT/US2005/044511, Jul. 14, 2006.
National Weather Service Aviation Weather Center (Aviation Digital Data Service (ADDS) [online]. [retrieved on Dec. 7, 2004]. Retrieved from Internet: <URL:adds.aviationweather.noaa.gov/pireps/>.

* cited by examiner

*Primary Examiner*—Yonel Beaulieu
(74) *Attorney, Agent, or Firm*—Black Lowe & Graham PLLC (57) ABSTRACT

An improved avionics display unit graphically presents meteorological phenomena data to a pilot enroute utilizing conventional pilot report (PIREP) information which includes meteorological phenomena data including phenomena location data. The avionics display unit generates an icon defined by the meteorological phenomena data of the PIREP information and presents the icon on a display of the avionics display unit overlaying a map display at an icon location determined in response to the phenomena location data of the PIREP information.

28 Claims, 7 Drawing Sheets

TYPE SYMBOL TABLE

| TYPE | ICING | TURBULENCE |
|---|---|---|
| RIME | ∽ | N/A |
| CLEAR | —□— | N/A |
| MIXED | — — | N/A |
| ISOLATED | N/A | ········· |
| INTERMITTENT | N/A | — — — |
| CONTINUOS | N/A | ——— |

FIG. 4

INTENSITY CODE TABLE

| INTENSITY | ICING | TURBULENCE |
|---|---|---|
| NEGATIVE | ⊘ (BLUE) | ⊘ (BLUE) |
| TRACE | ∪ (AQUA) | N/A |
| TRACE-LIGHT | ψ (GREEN) | N/A |
| LIGHT | ψ (GREEN) | ∧ (GREEN) |
| LIGHT-MODERATE | ψ (YELLOW) | ⌐∧⌐ (YELLOW) |
| MODERATE | ψ (YELLOW) | ⌐∧⌐ (YELLOW) |
| MODERATE-SEVERE | ψ (RED) | ⌐∧⌐ (RED) |
| SEVERE | ψ (RED) | ⌐∧⌐ (RED) |
| SEVERE-EXTREME | N/A | ▲ (PURPLE) |
| EXTREME | N/A | ▲ (PURPLE) |

INFLIGHT GRAPHICAL DISPLAY OF METEOROLOGICAL PHENOMENA AND METHOD THEREFOR

FIELD OF THE INVENTION

The present invention generally relates to avionics display units in aircraft cockpits, and more particularly relates to a method and apparatus for improved in-flight graphical display of meteorological phenomena data on avionics display units.

BACKGROUND OF THE INVENTION

In the aviation industry, pilots customarily report data on meteorological phenomena for the locations and altitudes through which they are flying. Many pilots communicate this information to designated collection points. In the United States, this information is sent by pilots in the form of Pilot Reports, or PIREPs, on designated VHF frequencies or by data link to one of the Federal Aviation Authority's (FAA's) ground facilities such as Flight Service Stations (FSS). The FAA collects this information and disseminates it in the form of alphanumeric bulletins via the National Weather Service (NWS) for usage such as preflight briefings. At preflight briefings, pilots can access NWS provided PIREPs and other meteorological information in several formats at its Aviation Digital Data Service website.

Enroute, however, when it is desirable to have the most current meteorological information, pilots can obtain PIREPs orally by contacting Flight Watch or FSSs, or in the form of alphanumeric messages if the aircraft is suitably equipped to receive and display data linked weather products. PIREPs include meteorological phenomena such as sky cover, visibility, temperature, winds, turbulence, and icing conditions. Also included in these reports are the time, location, altitude and identification and intensity of the meteorological condition. PIREPs are presently one of the best sources of current turbulence and icing conditions enroute and may sometimes be the only source of current weather conditions in-flight.

As can be easily understood, pilots who receive PIREPs orally may only retain limited information. For those who obtain the PIREPs in alphanumeric form, the abbreviated message format can be difficult to interpret and remember. For example, if visibility is of interest to the pilot at the time he receives the PIREP, it is possible that the pilot may retain only the visibility information of the PIREP. Therefore, while it is desirable for enroute pilots to obtain weather updates enough in advance to allow them to circumvent inclement weather conditions, the potential exists that a pilot may not have sufficient information for adverse weather conditions that may be encountered, even though he may have received PIREPs advising him of those conditions.

Avionics display units are situated in the cockpit to present information to pilots in various modes. Typically, the avionics display unit is capable of displaying a map background showing the pilot geographical information within a predetermined distance of the aircraft's current position. While localized information can be superimposed on the map background to present that information to the pilots at a useful time and place, PIREPs are presented to the pilots orally or via cryptic alphanumeric data linked messages. Furthermore, unlike other weather products disseminated by the NWS on a regularly scheduled basis for a fixed set of locations, the time and location of PIREPs varies. This non-regularity can make it difficult for pilots to be aware of the existence of a PIREP.

Accordingly, it is desirable to present the PIREP information in the cockpit in a manner more useful to pilots. What is needed, therefore, is an improved method and apparatus for presenting the PIREP information to the pilots more meaningfully. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for an improved avionics display unit for providing pilot report (PIREP) information to a pilot enroute in an aircraft having aircraft receiver circuitry for receiving and decoding the PIREP information. The PIREP information includes flight location data, flight level data, weather phenomena data and report time data representing a report time of the PIREP information. The weather phenomena data includes phenomena location data, phenomena altitude data, phenomena type data and phenomena intensity data. The avionics display unit includes a memory, an avionics display unit user interface, a PIREP icon generator, a map background generator, a PIREP display generator, and a display. The memory is coupled to the aircraft receiver circuitry and receives and stores the PIREP information. The avionics display unit user interface generates a graphical pilot report request signal in response to a user input. The PIREP icon generator is coupled to the avionics display unit user interface and the memory to generate an icon in response to the graphical pilot report request signal and the report time data. The icon is defined by the phenomena altitude data, the phenomena type data and the phenomena intensity data. The map background generator is coupled to the display and generates map background information for defining a map display. The PIREP display generator is coupled to the display, the map background generator and the PIREP icon generator to present the map display on the display and present the icon on the display at an icon location on the map display where the icon location is determined in response to the phenomena location data.

A method is provided for presenting meteorological phenomena data on an avionics display unit of an aircraft. The avionics display unit includes a memory which receives and stores pilot report (PIREP) information, a map background generator and a display coupled to the memory and the map background generator. The PIREP information includes flight location data, flight level data, meteorological phenomena data and report time data representing a report time of the PIREP information, the meteorological phenomena data including phenomena location data, phenomena altitude data and phenomena type data. The method includes the steps of generating an icon defined by the meteorological phenomena data of the PIREP information in response to a graphical pilot report request signal and presenting the icon at an icon location on the display over a map display generated by the map background generator, the icon location determined in response to the phenomena location data of the PIREP information.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
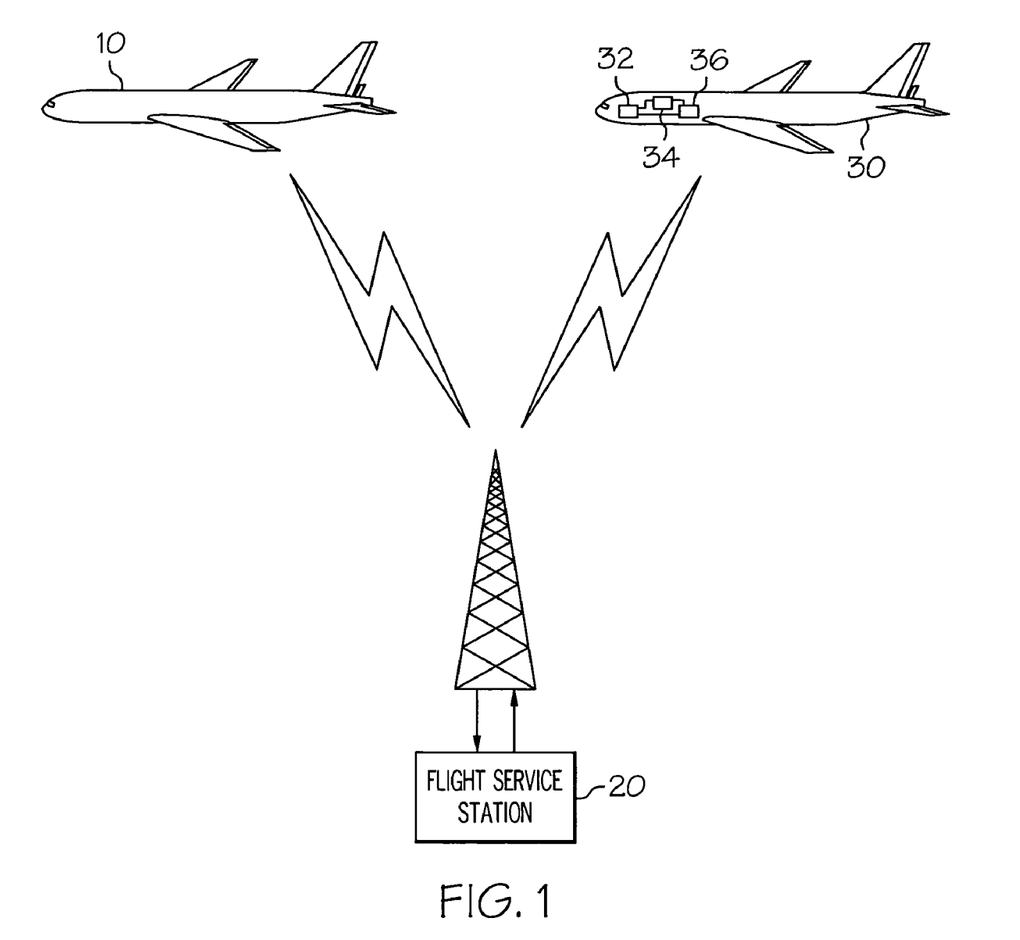
FIG. 1 is a diagram of the collection and transmission of pilot reports (PIREPs)

Referring to FIG. 1, aperiodic pilot reports, called PIREPs, are broadcast by pilots, for example, the pilot in aircraft 10. The PIREPs contain pilot information on meteorological phenomena encountered by aircraft 10 in flight such as turbulence, cloud levels, and icing. Flight Service Stations 20 are ground facilities operated by the United States' Federal Aviation Authority which are in direct contact with pilots enroute. The Flight Service Stations 20 typically collect the PIREPs received from aircrafts 10 and rebroadcast them.

The PIREP information contains report type information, identification of at least one weather element encountered and flight location data in the form of geo-referencing to a specific navigational aid, airport, or navigational fix. The PIREP information also typically includes flight level data, aircraft type data, meteorological phenomena data and report time data representing a report time of the PIREP information. The meteorological phenomena data includes phenomena location data, preferably in the form of latitude and longitude of reported meteorological phenomena (which may be derived from the flight location data), as well as phenomena altitude data and phenomena type data. Some PIREP information may additionally contain either turbulence and/or icing elements. The general form of a textual PIREP report is shown in Table 1.

TABLE 1

| LAT | Latitude |
| LON | Longitude |
| Jepp. ID | Accountable Facility |
| UUA/UA | Type of Report |
| OV | Location |
| TM | Time |
| FL | Flight Level (altitude) |
| TP | Aircraft Type |
| SK | Sky Cover |
| WX | Flight visibility & weather |
| TA | Temperature |
| WV | Wind |

TABLE 1-continued

| TB | Turbulence |
| IC | Icing |
| RM | Remarks |

The phenomena location data represented as latitude (LAT) and longitude (LON) of the reported weather phenomena is computed based on the contents of the location (OV) field and inserted into the PIREP report information as shown in Table 1. Preferably the size of the latitude field is two octets and the latitude is coded as a signed integer representing hundredths of degrees ranging from −9000 to 9000. If the latitude is not available the most significant bit of this field shall be set to zero followed by all ones. Likewise, the size of the longitude field is preferably two octets and the longitude is coded as a signed integer representing hundredths of degrees ranging from −18000 to 18000.

The Jeppesen identifier (Jepp. ID) is the identifier of the surface observation location, i.e., FSS 20, which was responsible for encoding and disseminating the PIREP report. If the latitude is not available the Jeppesen identifier shall be used as phenomena location data for display report filtering; otherwise the contents of the latitude and longitude fields shall be used. The Jeppesen identifiers can be either three or four characters, so a space character is preferably inserted following the Jeppesen identifier field as a delimiter.

The report time data (TM) is the time the phenomenon was encountered or occurred and is expressed in UTC time in four digits—two digits for hours and two digits for minutes (e.g., TM 2359). Flight Level (FL) is expressed as three digits for hundreds of feet with no space between FL and altitude. Altitude references are mean sea level unless otherwise noted. If the altitude is unknown then the flight level field is set to UNKN. If the condition was encountered within a layer the altitude range of the layer is entered by entering the lower limit and higher limit of the altitude range (e.g., FLHHH-HHH). The flight level field is used for phenomena altitude data when there is no reported altitude in the meteorological phenomena data.

In accordance with the preferred embodiment of the present invention, the phenomena type data may be found in the turbulence field (TB) or the icing field (IC). The turbulence (TB) field uses standard abbreviations for intensity and type (e.g., CAT, CHOP, or blank, where CAT indicates Clear Air Turbulence). The intensity is shown as light (LGT), moderate (MOD), severe (SEV), or extreme (EXTRM). The altitude is included only if it is different from the Flight Level field or is reported as a layer between defined boundaries. If no turbulence was encountered then NEG is entered. The icing (IC) field is described using intensity (i.e., trace, light, moderate, severe, or ranges covering two values separated by a hyphen) and standard abbreviations. The altitude is included only if it is different from the Flight Level field or is reported as a layer and, if present, the altitude is the phenomena altitude data. If icing was forecast at any level, but none was encountered then NEG is entered.

The textual PIREP information is broadcast as described above and the PIREP information is received by aircraft 30. The aircraft receiver circuitry 32 of aircraft 30 receives, demodulates and decodes the PIREP information and provides the PIREP information to avionics 34 and an avionics display unit 36.

Figure 2:
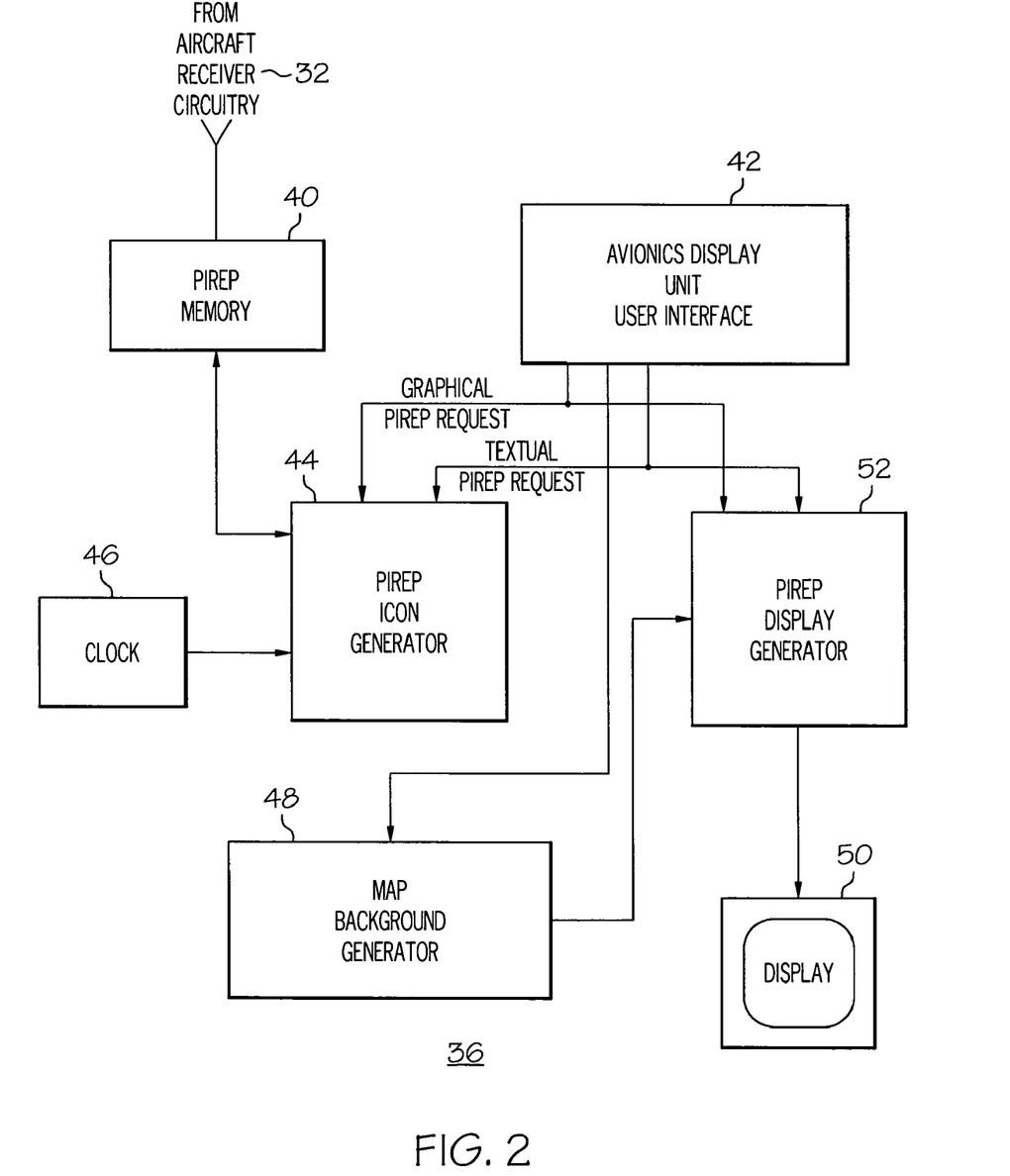
FIG. 2 is a block diagram of the avionics display unit in accordance with the preferred embodiment of the present invention.

Referring to FIG. 2, the avionics display unit 36 in accordance with the preferred embodiment of the present invention includes a memory 40 coupled to the aircraft receiver circuitry 32 (FIG. 1) for receiving and storing the PIREP information. An avionics display unit user interface 42 allows the pilot to control the operation of the avionics display unit 36. The user interface may be any or all of a pointer over the display, a touchscreen over the display, a predefined key or keys, or a keyboard. In accordance with the preferred embodiment of the present invention, the pilot can access the user interface 42 to request display of graphical PIREP information, the user interface 42 generating a graphical PIREP request signal in response to the pilot's input. The user interface 42 is coupled to a PIREP icon generator 44 to provide the graphical PIREP request signal thereto.

The PIREP icon generator 44, in response to the graphical PIREP request signal, retrieves the PIREP information for selected PIREP from the PIREP memory 40 and determines whether the PIREP information is expired. The PIREP icon generator 44 does this by examining a clock signal from clock 46 and determining whether the report time data indicates that the PIREP information is more than two hours old. The selected PIREP to be retrieved from the memory are determined in response to the graphical PIREP request signal. If the PIREP information is expired PIREP information, then the PIREP icon generator 44 deletes that PIREP information from the PIREP memory 40. For PIREP information that is not expired (i.e., less than 120 minutes old), then the PIREP icon generator generates icons defined by the phenomena altitude data, the phenomena type data and the phenomena intensity data.

A map background generator 48 is coupled to the avionics display unit user interface 42 and, in response to a signal from the user interface 42, generates map background information. The map background information is defined by the location of the aircraft and other predefined parameters or, alternatively, may be defined by user selectable parameters. The predefined parameters could be the scale of the map or the defined flight path of the aircraft. The map background generator 48 may be coupled to the avionics display unit user interface 42 to receive user selectable parameters such as information defining the scale of the map or selection by the user between several optional map displays. The map background generator 48 is coupled to a display 50 and map background information defines a map display on the display 50.

A PIREP display generator 52 is coupled to the avionics display unit user interface 42, the display 50, the map background generator 48 and the PIREP icon generator 44 to present the map display on the display with the icon overlaid on the display at an icon location defined by the phenomena location data in response to the graphical PIREP request signal received from the avionics display unit user interface 42.

If the pilot wishes to view the PIREP information in textual form, he can enter the appropriate input to the avionics display unit user input 42 to generate a textual PIREP signal for providing to the PIREP icon generator 44 and the PIREP display generator 52. This input could be merely pointing to a graphical PIREP icon on the display 50 or pointing to the graphical PIREP icon on the display 50 while simultaneously entering a predefined MORE INFO input. The second, two-step input advantageously allows simply pointing to the graphical PIREP icon on the display 50 to display a pop-up box containing a subset of the textual PIREP information such as the identification of the FSS 20 (FIG. 1) and the age of the PIREP information determined from the report time data.

Figure 3A:
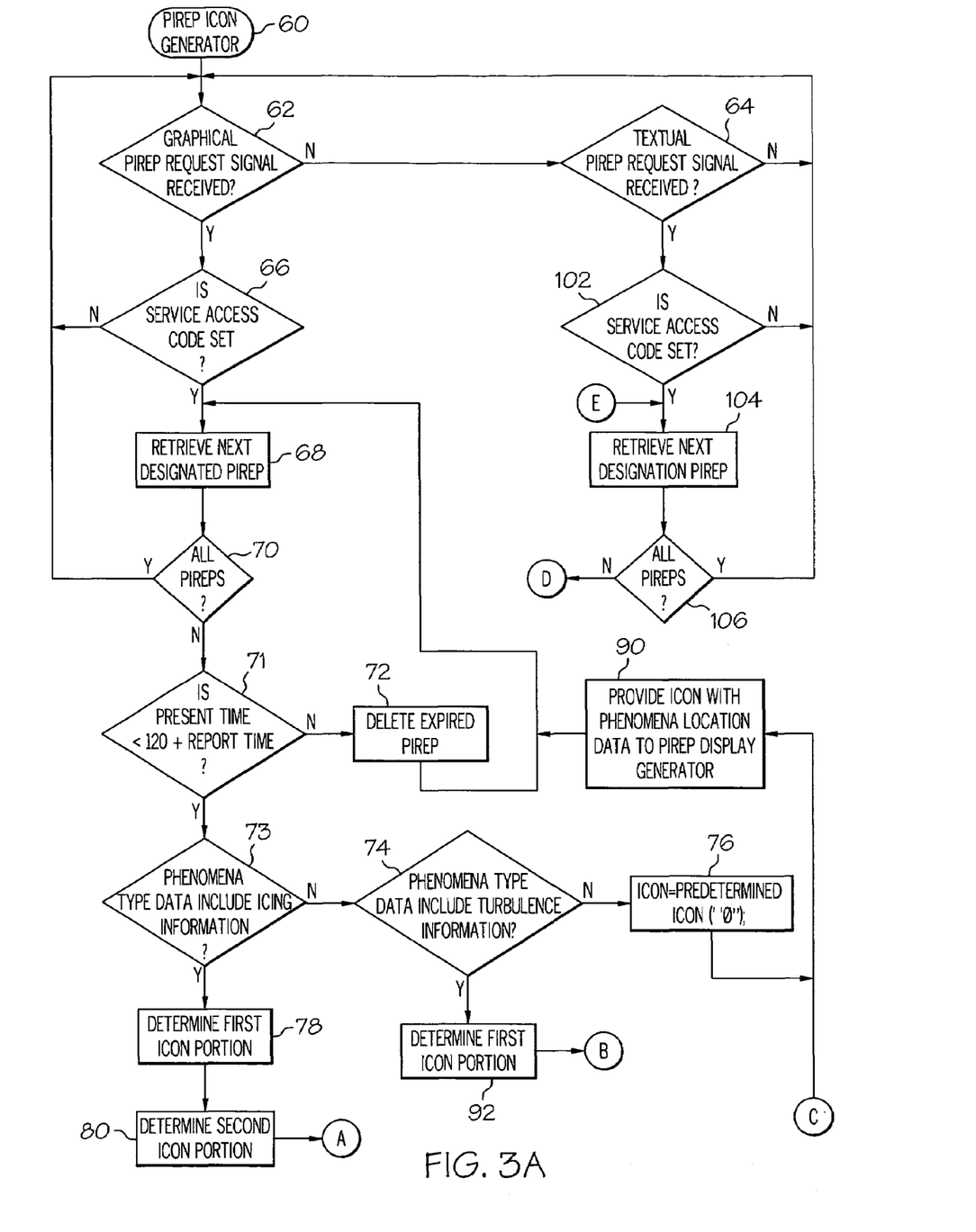
FIG. 3 is a flowchart of the operation of the PIREP icon generator of the avionics display unit in accordance with the preferred embodiment of the present invention.
Figure 3B:
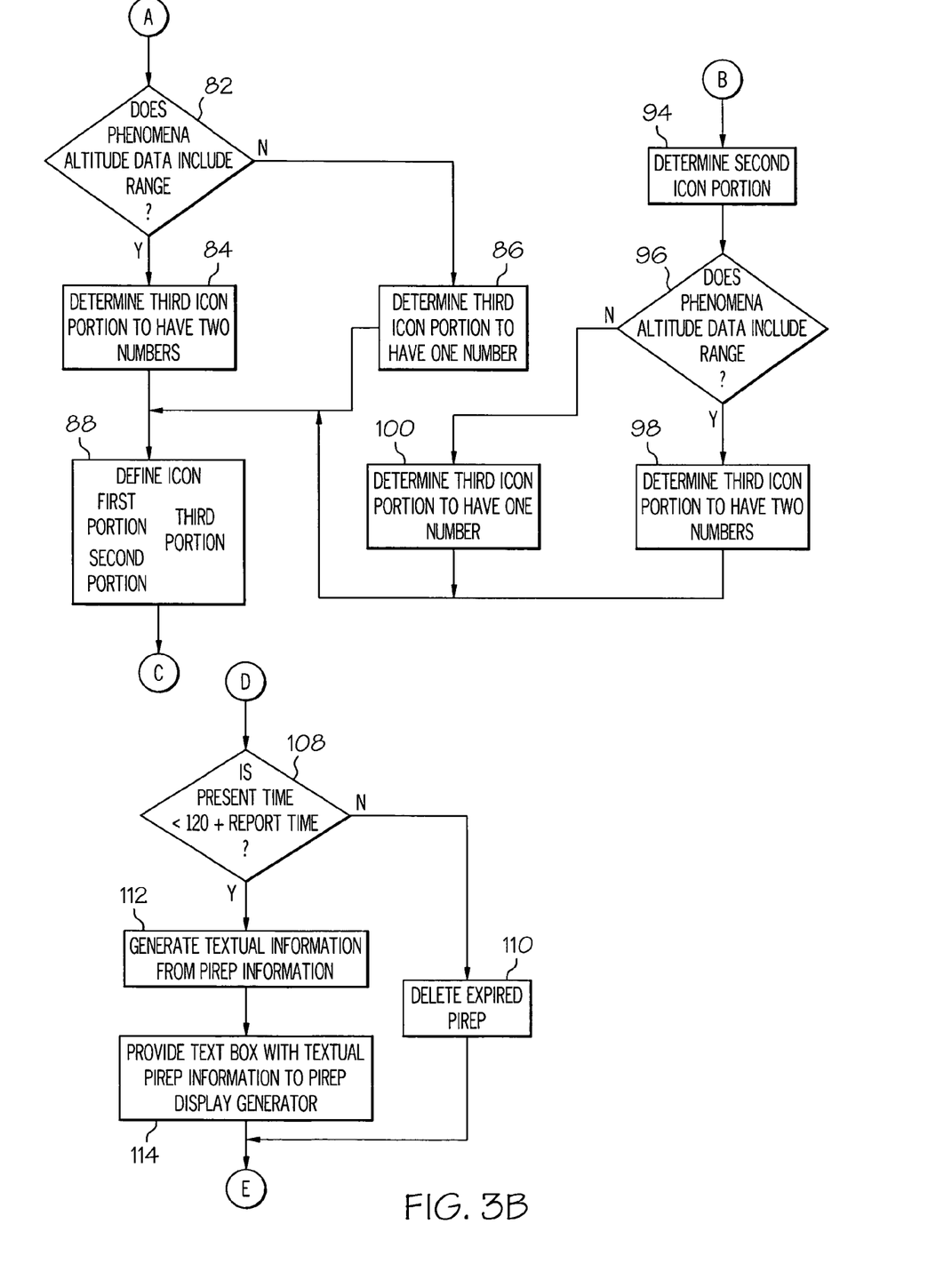

Referring to FIG. 3, a flowchart showing operation of the PIREP icon generator 44 is depicted. Operation of the PIREP icon generator 44 begins upon power on at step 60. Operation then awaits reception of either a graphical PIREP request signal 62 or a textual PIREP request signal 64 from the avionics display unit user interface 42. If a graphical PIREP request signal is received 62, the PIREP icon generator 44 determines whether the appropriate bit is set in the service access code that indicates that the aircraft has subscribed to the graphical PIREP capability 66. If the user has not subscribed to this feature 66, no further processing is performed and operation returns to await reception of either a graphical PIREP request signal 62 or a textual PIREP request signal 64.

If the user has subscribed to this feature 66, the PIREP icon generator 44 retrieves 68 designated PIREP information from the PIREP memory 40 (FIG. 2). The manner of user designation of which PIREP information to retrieve could be a single preprogrammed scheme or could be one of several user selectable schemes indicated by the graphical PIREP request signal. For example, the scheme could retrieve PIREP information based upon the report time data by first retrieving the most recently received PIREP information. Alternatively, the scheme could retrieve PIREP information based upon the phenomena location data. This could be done by the pilot selecting a particular location on the map display by placing a pointer at a particular spot on the display and retrieving PIREP information having phenomena location data within a predetermined radius of that location (e.g., a two hundred kilometer radius of the selected location). This could also be done by indicating a selected flight path, a flight destination or a pilot defined entry and retrieving PIREP information having phenomena location data related to the indicated input.

Whichever scheme is used, the designated PIREP information is retrieved 68 from the PIREP memory 40 and it is determined whether all of the designated PIREP information has been processed 70. If all of the designated PIREP information has been processed 70, then operation returns to await reception of either a graphical PIREP request signal 62 or a textual PIREP request signal 64. If all of the designated PIREP information has not been processed 70, it is next determined whether the PIREP information is expired PIREP information 71. In accordance with the preferred embodiment of the present invention, the PIREP information is expired PIREP information 71 if the present time as defined by the clock signal from clock 46 (FIG. 2) is greater than or equal to one hundred twenty minutes after the PIREP report time. If the PIREP information is expired PIREP information 71, the PIREP information is deleted 72 from the PIREP memory 40 (FIG. 2) and processing returns to retrieve the next PIREP information 68.

If the PIREP information is not expired PIREP information 71, it is next determined whether the weather phenomena data includes phenomena type data indicating an icing condition 73 or a turbulence condition 74. If neither condition is present, the PIREP icon generator 44 generates a predetermined icon 76 and processing returns to retrieve the next PIREP information 68. In accordance with the preferred embodiment of the present invention, the predetermined icon is a circular icon such as "Ø".

Figure 4:
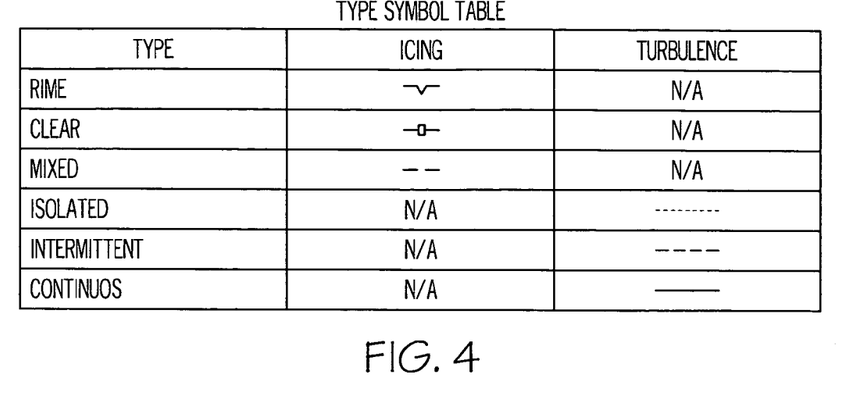
FIG. 4 depicts the PIREP icon in accordance with the preferred embodiment of the present invention.
Figure 5:
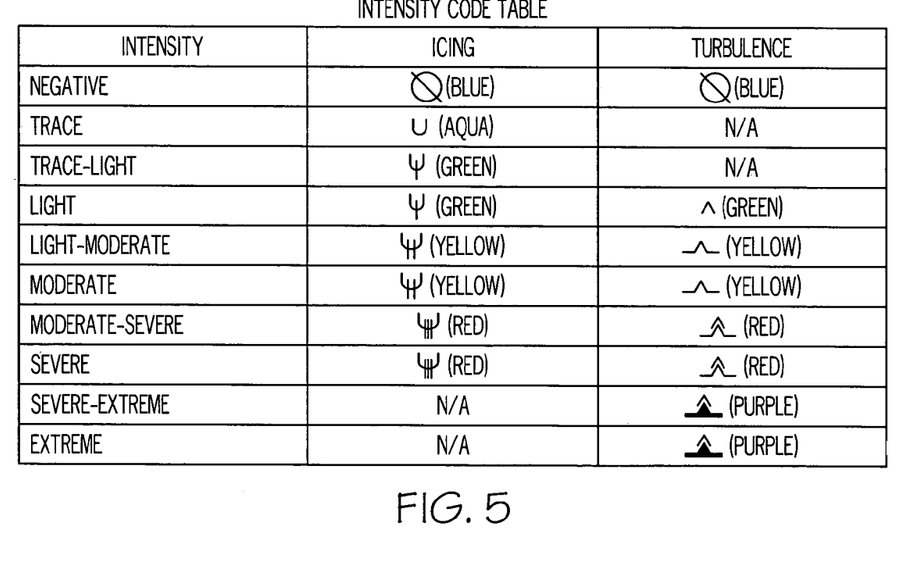
FIG. 5 is a table of weather phenomena intensity codes in accordance with the preferred embodiment of the present invention.

If the weather phenomena data includes phenomena type data indicating an icing condition 73, a condition symbolic icon is generated including a first portion 78, a second portion 80 and a third portion 82, 84, 86, the second portion located below the first portion and the third portion located to the right of the first portion. The first portion generated indicates the icing type 78 and the second portion indicates an intensity of the icing condition 80, both the first and second portions generated in response to the phenomena type data. The icing type data utilizes the symbols shown in FIG. 4 to indicate rime, clear and mixed icing conditions. The icing intensity data is also symbolized using standard National Weather Service (NWS) color and shape symbols as shown in FIG. 5, indicating icing intensities from negative to extreme. If the phenomena altitude data indicates an altitude range 82, the third portion indicates the altitude range by depicting two numbers 84, the higher number over the lower number. If the phenomena altitude data does not indicate an altitude range 82, the third portion includes only the phenomena altitude data 86. The icing icon is thus generated 88 for provision to the display generator 90 along with the phenomena location data (e.g., LAT and LON) and processing returns to retrieve the next PIREP information 68.

In a like manner, if the weather phenomena data includes phenomena type data indicating a turbulence condition 74, a condition symbolic icon is also generated with a first portion 92, a second portion 94 and a third portion 96, 98, 100. In response to the phenomena type data, the first portion generated indicates the turbulence type 92 and the second portion indicates an intensity of the turbulence condition 94. The turbulence type data such as isolated, intermittent or continuous is depicted as shown in FIG. 4. The turbulence intensity data is also shown in FIG. 5, indicating turbulence intensities from negative to extreme in NWS standard color and shape symbols. If the phenomena altitude data indicates an altitude range 96, the third portion indicates the altitude range 98 and, if the phenomena altitude data does not indicate an altitude range 96, the third portion includes only the phenomena altitude data 100. The turbulence icon is thus generated 88 for provision to the display generator 90 along with the phenomena location data and processing returns to retrieve the next PIREP information 68.

Referring to FIG. 4, the types of weather phenomena indicated by the first portion of the graphical PIREP icon is discussed in more detail. While the graphical PIREP icon of the present invention uses some symbology familiar to pilots as icons using the intensity symbols of FIG. 5 are available at the NWS Aviation Digital Data Service website for preflight briefings, the preferred embodiment of the present invention advantageously displays a first portion of the icon indicating the types of icing and turbulence. The types of icing and turbulence identified in the table of FIG. 4 are currently not displayed by the NWS due to the low frequency of this type of information being reported by the pilots in a PIREP. The types of weather phenomena types are rime ice, clear ice, mixed ice, isolated turbulence, intermittent turbulence and continuous turbulence. Rime ice is rough, milky opaque ice formed by the instantaneous freezing of small, super-cooled water droplets, clear ice is a glossy, clear, or translucent ice formed by relatively slow freezing of large super-cooled water droplets, and mixed ice is a mixture of clear ice and rime ice. Isolated turbulence is turbulence occurring less than one third of the time, intermittent turbulence is turbulence occurring more than one third of the time but less than two thirds of the time, and continuous turbulence is turbulence occurring more than two-thirds of the time.

Referring to FIG. 5, the color and shape of the conventional phenomena intensity symbols used by the NWS are utilized by the present invention to define the second portion of the graphical PIREP icon. The predetermined icon "Ø" is displayed if no weather phenomena i.e., no icing or turbulence) is present. This information can be helpful to a pilot who has received forecast information or pre-flight information indicating turbulence or icing conditions at a location, since the PIREP information may be more recent than the forecast or pre-flight information. The aqua symbol for a trace icing condition indicates that the ice becomes perceptible and the rate of accumulation is slightly greater than the rate of sublimation and deicing or anti-icing equipment for ice build-up prevention is not recommended unless trace icing is encountered for an extended period of time such as more than an hour. The green light icing symbol signifies that the rate of ice accumulation may create a problem if a flight is prolonged in this environment (e.g., over one hour). Occasional use of deicing or anti-icing equipment may remove or prevent ice accumulation on the aircraft and light icing generally does not present a problem if the deicing or anti-icing equipment is used. The yellow moderate icing symbol is a sign that the rate of accumulation is such that even short encounters become potentially hazardous and use of deicing or anti-icing equipment or flight diversion is necessary. The red severe icing condition symbol denotes that the rate of accumulation is such that deicing or anti-icing equipment will fail to reduce or control the hazard and immediate flight diversion is necessary.

The green light turbulence symbol indicates that turbulence may momentarily cause slight, erratic changes in an aircraft's altitude or attitude (i.e., pitch, roll, or yaw). During light turbulence, occupants may feel a slight strain against seat belts or shoulder straps and unsecured objects may be displayed slightly. The yellow moderate turbulence symbol denotes turbulence similar to light turbulence but of greater intensity. Changes in aircraft altitude or attitude may occur during moderate turbulence, but the aircraft remains in positive control at all times. Moderate turbulence may also momentarily cause slight, erratic changes in altitude or attitude wherein occupants feel definite strains against seat belts or shoulder straps and unsecured objects are dislodged. The red severe turbulence symbol signifies turbulence resulting in large abrupt changes in aircraft altitude or attitude causing occupants to be forced violently against seat belts or shoulder straps and tossing unsecured objects about. The purple extreme turbulence symbol is a sign that extreme turbulence will violently toss the aircraft about and control of the aircraft is practically impossible to maintain. Extreme turbulence may cause structural aircraft damage.

Figure 6:
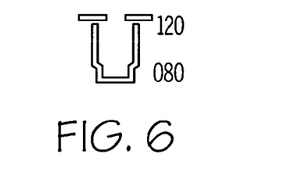
FIG. 6 is a table of weather phenomena type symbols in accordance with the preferred embodiment of the present invention.

Utilizing the phenomena type symbols of FIG. 4 and the phenomena intensity symbols of FIG. 5, an icon representing meteorological phenomena data is constructed as shown in FIG. 6. The icon of FIG. 6 indicates mixed icing in the first portion, trace icing intensity in the second portion and an altitude range in the third portion of eight thousand feet to twelve thousand feet. The first, second and third portions of the icon have an icon color of aqua defined in response to the color of the intensity code from the table of FIG. 5. Thus, the icon indicates that trace mixed icing was encountered at a specific location at an altitude between eight thousand and twelve thousand feet and the color readily tells the pilot that the icing, the weather phenomena indicated, was trace icing. The present invention enables pilots to access the meteorological phenomena data enroute, presenting the information to the pilot in a familiar format at useful times and places. To assist the pilot in deciphering the PIREP icon, a legend for interpreting the graphical PIREP symbology and color coding may be displayed with the map display on the display 50 (FIG. 2) or, alternatively, may be accessible to the pilot for display in response to a 'help' request.

Referring back to FIG. 3, the pilot may also request PIREP information in a textual format 64. When a textual PIREP request signal is received 64, the PIREP icon generator 44 determines whether the appropriate bit is set in the service access code that indicates that the aircraft has subscribed to this capability 102. If the user has not subscribed to this feature 102, no further processing is performed and operation returns to await reception of a graphical PIREP request signal 62 or a textual PIREP request signal 64.

If the user has subscribed to this feature 102, the PIREP icon generator 44 retrieves 104 designated PIREP information from the PIREP memory 40 (FIG. 2) and it is determined whether all of the designated PIREP information has been processed 106. If all of the designated PIREP information has been processed 106, then operation returns to await reception of a graphical PIREP request signal 62 or a textual PIREP request signal 64. If all of the designated PIREP information has not been processed 106, it is next determined whether the PIREP information is expired PIREP information 108. If the PIREP information is expired PIREP information 108 (i.e., the PIREP information is more than two hours old), the PIREP information is deleted 110 from the PIREP memory 40 (FIG. 2) and processing returns to retrieve the next PIREP information 104.

If the PIREP information is not expired PIREP information 108, textual PIREP information is generated from the PIREP information in a conventional manner 112 and the textual information is provided to the PIREP display generator 52 (FIG. 2) along with the PIREP phenomena location data 114. Processing of the PIREP icon generator 44 then returns to await reception of the next graphical PIREP request signal 62 or a textual PIREP request signal 64.

Figure 7:
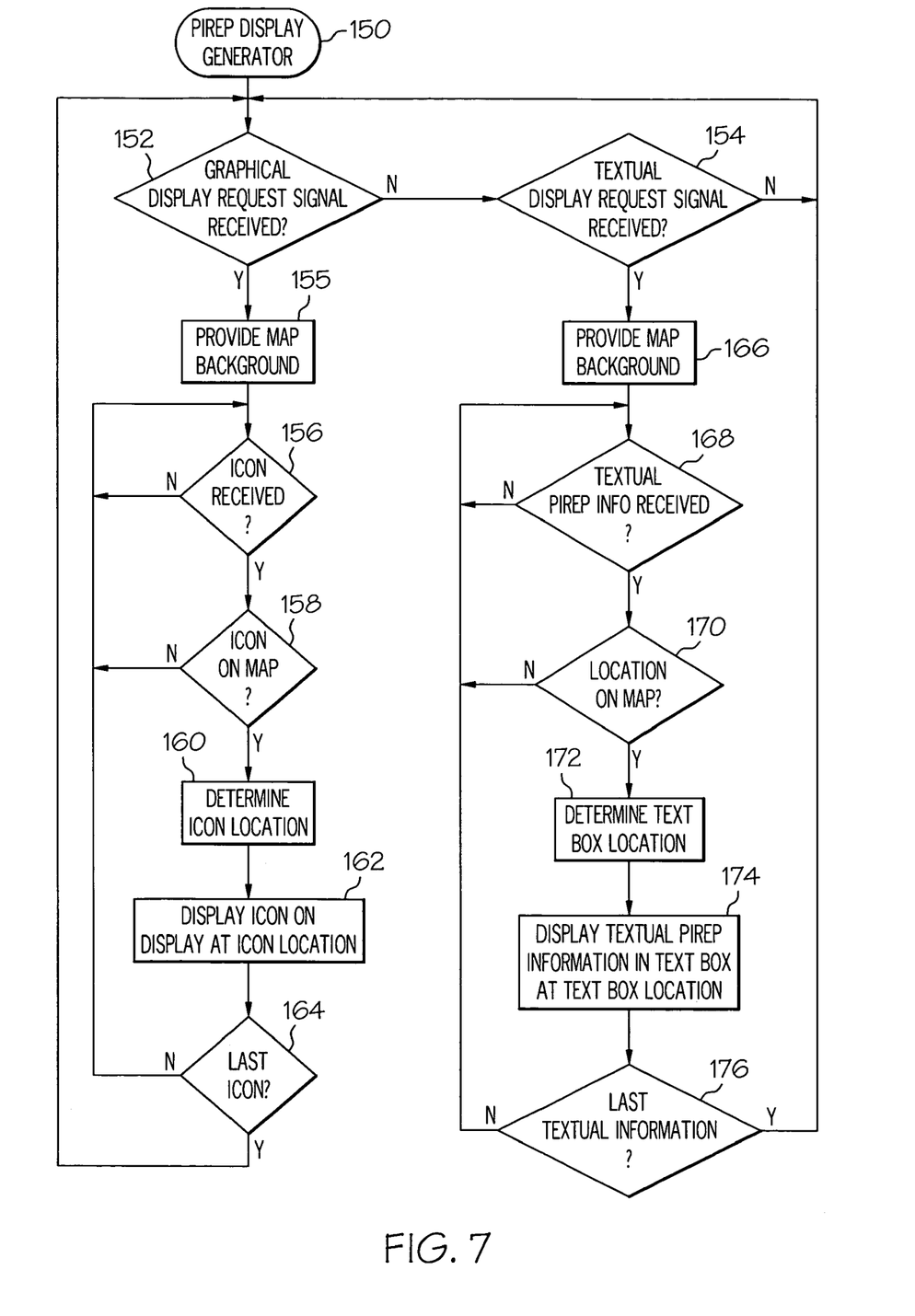
FIG. 7 is a flowchart of the operation of the display generator of the avionics display unit in accordance with the preferred embodiment of the present invention.

Turning now to FIG. 7, a flowchart of the operation of the PIREP display generator 52 (FIG. 2) begins 150 upon powering up of the avionics display unit. Operation then awaits reception of either a graphical PIREP request signal 152 or a textual PIREP request signal 154 from the avionics display unit user interface 42 (FIG. 2). If a graphical PIREP request signal is received 152, the PIREP display generator 52 provides the map background from the map background generator 48 to the display 50 (FIG. 2) for presentation thereon 155. When an icon including phenomena location information is received 156 from the PIREP icon generator 44, the display generator determines whether the icon location is within the map display area 158. If not, processing returns to await reception of another icon 156. If the icon location is within the area of the map display 158, the location of the icon on the map display is determined 160 and the graphical PIREP icon is displayed on the map display at the appropriate map coordinates 162 thereby enhancing the pilot's situational awareness. If the icon received is not the last icon 164, processing then returns to await the next icon information received 156. If the icon received is the last icon 164, processing then returns to await reception of either another graphical PIREP request signal 152 or a textual PIREP request signal 154.

When a textual PIREP request signal is received 154, the map background from the map background generator 48 is presented 166 on the display 50 (FIG. 2). When textual PIREP information including phenomena location information is received 168 from the PIREP icon generator 44, the display generator determines whether the phenomena location is within the map display area 170. If not, processing returns to await reception of another textual PIREP 168. If the phenomena location is within the area of the map display 170, the location of a text box for the textual PIREP information on the map display is determined 172 and the text box is overlaid on the map display 174 at the appropriate map coordinates. If the textual PIREP information received is not the last textual PIREP 176, processing then returns to await the next textual PIREP information received 168. If the textual PIREP information received is the last textual PIREP 176, processing then returns to await reception of either another graphical PIREP request signal 152 or a textual PIREP request signal 154.

Figure 8:
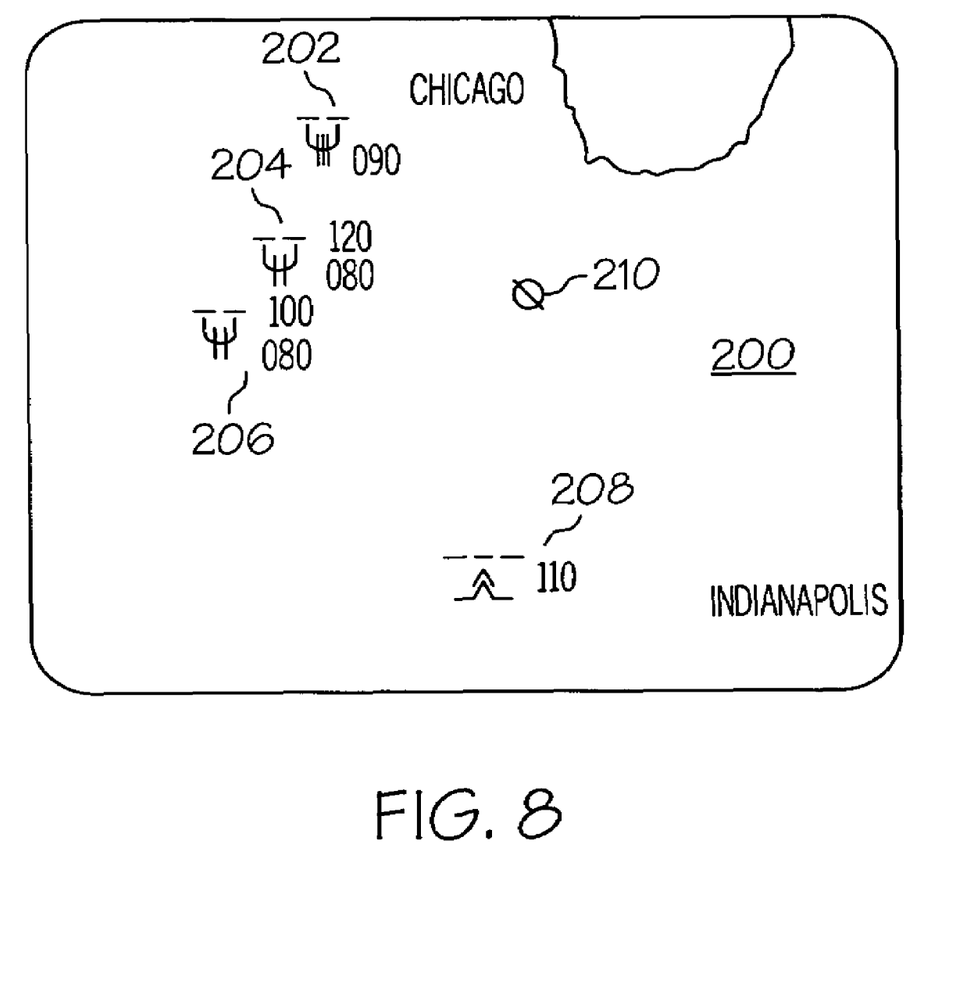
FIG. 8 depicts a display of the avionics display unit in accordance with the preferred embodiment of the present invention.

Referring to FIG. 8, a display 50 of the avionics display unit in accordance with the preferred embodiment of the present invention is depicted. A map background 200 shows a map display having terrain features such as lakes, rivers and cities and having a map display area within a predefined map coordinate range. Generally the map display area is determined from a predetermined or user selectable scale and is centered on the aircraft's current position. Alternatively, the map display area can be defined in response to the aircraft's flight path, defined in response to the aircraft's destination, or user definable. Condition symbolic icons indicating icing conditions 202, 204, and 206 and turbulence conditions 208 are overlaid on the map display in accordance with the preferred embodiment of the present invention. A predetermined icon 210 (circular icon "Ø") is overlaid on the map at a location south of Chicago. Icon 202 indicates that moderate to severe icing was detected at nine thousand feet southwest of Chicago. The first, second and third portions of icon 202 have an icon color of red, the icon color determined in response to the color assigned to the second portion (the meteorological phenomena intensity) of the icon (FIG. 5). Moving slightly further southwest of Chicago, moderate icing conditions were detected between eight thousand and twelve thousand feet 204 and between eight thousand and ten thousand feet 206 and both icon 204 and icon 206 have an icon color of yellow.

South of Chicago and west of Indianapolis, red icon 208 indicates PIREP information of severe intermittent turbulence at eleven thousand feet. Icon 208 has a red icon color in accordance with the color-coded intensity second portion thereof. Blue icon 210 denotes that predicted icing or turbulence conditions at the location south of Chicago were not detected.

The color-coded graphical PIREP icons provide visual representation of icing and turbulence conditions surrounding the aircraft's geographical position or on the aircraft's flight path, thereby providing improved pilot situational awareness resulting in safer flight by providing timely and pertinent information to the pilot in the cockpit so that enroute course corrections can be considered. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for presenting meteorological phenomena data on an avionics display unit of an aircraft comprising:
    a memory, a map background generator and a display coupled to the memory and the map background generator wherein the avionics display unit has received pilot report (PIREP) information and stored the PIREP information in the memory, the PIREP information including flight location data, flight level data, meteorological phenomena data and report time data representing a report time of the PIREP information, wherein the meteorological phenomena data comprises phenomena location data, phenomena altitude data and phenomena type data, the method comprising the steps of:
    generating an icon defined by the meteorological phenomena data of the PIREP information in response to a graphical pilot report request signal; and presenting the icon at an icon location on the display over a map display generated by the map background generator, the icon location determined in response to the phenomena location data of the PIREP information.

2. The method of claim 1 wherein the step of generating the icon comprises the steps of: determining whether the PIREP information is expired PIREP information in response to the report time data; and deleting the PIREP information from the memory if the PIREP information is expired PIREP information, and wherein the step of presenting the icon comprises the step of presenting the icon at the icon location on the avionics display unit if the PIREP information is not expired PIREP information.

3. The method of claim 2 wherein the avionics display unit further comprises a clock for generating a clock signal representing present time and wherein the step of determining whether the PIREP information is expired PIREP information comprises the step of determining whether the present time is more than a predetermined time duration after the report time.

4. The method of claim 3 wherein the predetermined time duration is 120 minutes.

5. The method of claim 1 wherein the step of generating an icon comprises the steps of: determining whether the weather phenomena data comprises phenomena type data indicating at least one of an icing condition or a turbulence condition; generating a predetermined icon if the phenomena type data does not indicate at least one of an icing condition or a turbulence condition; and generating a condition symbolic icon if the phenomena type data indicates at least one of an icing condition or a turbulence condition.

6. The method of claim 5 wherein the step of generating a predetermined icon comprises the step of generating a circular icon.

7. The method of claim 5 wherein the step of generating a condition symbolic icon comprises the step of generating a condition symbolic icon including a first icon portion indicating one of an icing condition or a turbulence condition in response to the phenomena type data.

8. The method of claim 7 wherein the step of generating a condition symbolic icon including a first icon portion comprises the step of generating a condition symbolic icon including a first icon portion indicating an icing condition that is one of the set of a rime ice condition, a clear ice condition or a mixed ice condition in response to the phenomena type data.

9. The method of claim 7 wherein the step of generating a condition symbolic icon including a first icon portion comprises the step of generating a condition symbolic icon including a first icon portion indicating a turbulence condition that is one of the set of an isolated turbulence condition, an intermittent turbulence condition or a continuous turbulence condition in response to the phenomena type data.

10. The method of claim 7 wherein the step of generating a condition symbolic icon comprises the step of generating a condition symbolic icon including a second icon portion indicating an intensity of the turbulence condition or the icing condition in response to the phenomena type data, the second icon portion being located below the first icon portion.

11. The method of claim 10 wherein the step of generating a condition symbolic icon comprises the step of generating a condition symbolic icon having an icon color determined in response to the second icon portion.

12. The method of claim 7 wherein the step of generating a condition symbolic icon comprises the step of generating a condition symbolic icon including a third icon portion indicating an altitude of the turbulence condition or the icing condition in response to the phenomena altitude data, the third icon portion having at least one number and being located to the right of the first icon portion.

13. The method of claim 12 wherein the step of generating the third icon portion comprises the step of generating the third portion of the condition symbolic icon having two numbers, the two numbers including a higher number and a lower number indicating an altitude range determined in response to the phenomena altitude data, the higher number located above the lower number.

14. The method of claim 1 wherein the step of presenting the icon at an icon location on the display over a map display generated by the map background generator comprises the step of generating the map display in response to one of the set of a present location of the aircraft, a flight path of the aircraft, a destination of the aircraft or a user selectable location.

15. The method of claim 14 wherein the step of presenting the icon at an icon location on the display over a map display generated by the map background generator comprises the step of generating the map display in response to the present location of the aircraft and one of a predetermined scale or a user selectable scale.

16. The method of claim 1 further comprising the steps of: generating textual information defined by the PIREP information in response to a textual pilot report request signal; and presenting the textual information at a text box location on the display over the map display generated by the map background generator, the text box location determined in response to the phenomena location data of the PIREP information.

17. An avionics display unit in an aircraft having aircraft receiver circuitry for receiving and decoding pilot report (PIREP) information, the PIREP information including flight location data, flight level data, weather phenomena data and report time data representing a report time of the PIREP information, the weather phenomena data comprising phenomena location data, phenomena altitude data, phenomena type data and phenomena intensity data, the avionics display unit comprising:
   a memory coupled to the aircraft receiver circuitry for receiving and storing the PIREP information;
   an avionics display unit user interface for generating a graphical pilot report request signal in response to a user input;
   a PIREP icon generator coupled to the avionics display unit user interface and the memory for generating an icon in response to the graphical pilot report request signal and the report time data, the icon defined by the phenomena altitude data, the phenomena type data and the phenomena intensity data;
   a display;
   a map background generator coupled to the display for generating map background information defining a map display; and
   a PIREP display generator coupled to the display, the map background generator and the PIREP icon generator for presenting the map display on the display and for presenting the icon on the display at an icon location on the map display, the icon location determined in response to the phenomena location data.

18. The avionics display unit of claim 17 further comprising a clock coupled to the PIREP icon generator for providing a clock signal representing present time thereto, and wherein the PIREP icon generator determines whether the PIREP information is expired PIREP information in response to the report time data and the present time signal.

19. The avionics display unit of claim 18 wherein the icon generator deletes the PIREP information from the memory if the PIREP information is expired PIREP information.

20. The avionics display unit of claim 18 wherein the PIREP icon generator determines whether the PIREP information is expired PIREP information in response to determining whether the present time is more than a predetermined time duration after the report time.

21. The avionics display unit of claim 20 wherein the predetermined time duration is 120 minutes.

22. The avionics display unit of claim 17 wherein the icon generator generates the icon comprising a first icon portion generated in response to the phenomena type data, a second icon portion generated in response to the phenomena intensity data and located directly below the first icon portion, and a third icon portion generated in response to the phenomena altitude data, the third icon portion located to the right of the first and second icon portions.

23. The avionics display unit of claim 22 wherein the icon generator generates the icon having an icon color, the icon color determined in response to the second portion of the Icon.

24. The avionics display unit of claim 22 wherein the first icon portion and the second icon portion are symbols and wherein the third icon portion is at least one number.

25. The avionics display unit of claim 24 wherein the third icon portion comprises a first number and a second number, the first number greater than the second number, and wherein the first and second numbers indicate an altitude range determined in response to the phenomena altitude data, the first number located above the second number.

26. The avionics display unit of claim 17 wherein the map background generator generates the map background information for defining the map display in response to one of the set of a present location of the aircraft, a flight path of the aircraft, a destination of the aircraft or a user selectable location.

27. The avionics display unit of claim 26 wherein the map background generator generates the map background information for defining the map display in response to the present location of the aircraft and one of a predetermined scale or a user selectable scale.

28. The avionics display unit of claim 17 wherein the PIREP icon generator generates textual information in response to a textual pilot report request signal and the report time data, the textual information defined by the PIREP information, and wherein the PIREP display generator presents the textual information on the display at a text box location on the map display, the text box location determined in response to the phenomena location data.

* * * * *